Patented June 6, 1933

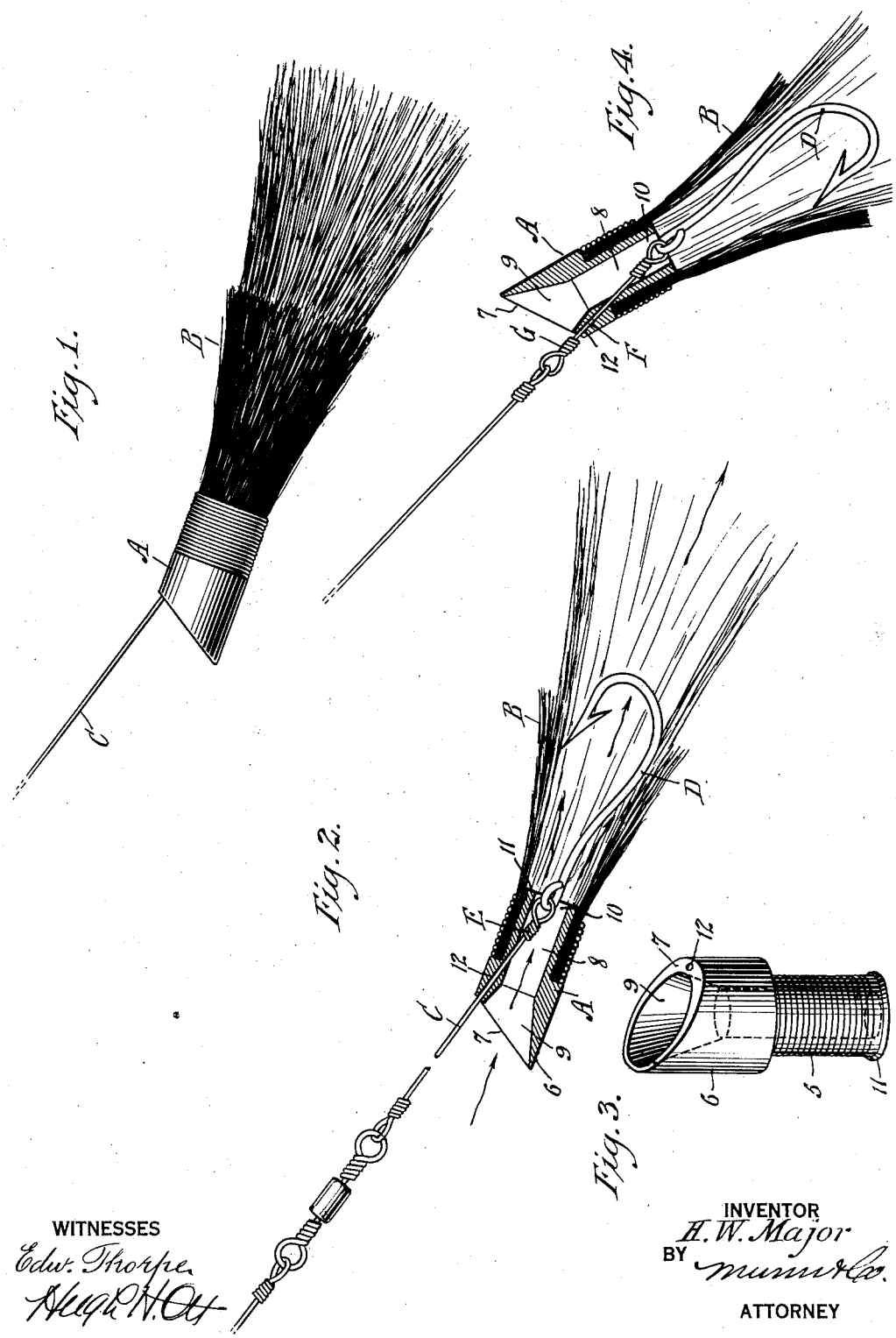

1,913,282

UNITED STATES PATENT OFFICE

HARLAN W. MAJOR, OF NEW YORK, N. Y.

FISH LURE

Application filed October 9, 1931. Serial No. 567,924.

This invention relates to fish lure, and has particular reference to that class of lure which is adapted to be moved through the water and which includes a tuft of hair, fibers, bristles, feathers, pork rind or other equivalent flexible attracting elements of this character which are designed to give the necessary action for simulating live bait.

It has been observed that lure of this type previously devised is defective, in that the flexible attracting elements fail of their purpose to a marked degree, and said failure may be largely attributed to the fact that the movement of the same through the water operates to set up an inwardly acting radial pressure upon the flexible attracting elements, which combined with a cohesive action flowing from the wetting of the elements, practically precludes or reduces to a minimum the individual or relative vibratory, quivering, wiggling or other desirable action intended.

It is, therefore, the principal and outstanding object of this invention to overcome this defect by so constructing the lure as to provide means for counteracting the inward or radial pressure of the water and the cohesive tendency of the flexible attracting elements.

The invention more particularly resides in the provision of a lure of the indicated character, in which the head or mounting for the flexible elements is provided with a passage extending longitudinally thereof or in the line of its axis, whereby the water passes therethrough to produce a jet axially of and within the confines of the flexible attracting elements, by virtue of which a pressure is set up which counteracts the inwardly acting radial pressure as well as the cohesive action, and which further acts upon the flexible elements to impart the desired activity thereto for performing the function intended.

A further important feature, as evidenced by one form of the invention, is the slidable association of the lure with the leader or line to which the hook is attached, so that while the lure is normally located adjacent the hook, advantage of the weight of the same cannot be taken by the fish in attempts to dislodge or shake the hook free.

Other objects of the invention reside in the comparative simplicity of construction of the lure, the economy with which the same may be produced and the general efficiency derived therefrom.

With the above recited and other objects in view, reference is had to the following description and accompanying drawing, in which there are exhibited several embodiments or examples of the invention, while the claims define the actual scope of the same.

In the drawing:

Figure 1 is a side view of a fish lure constructed in accordance with the invention.

Figure 2 is a longitudinal sectional view therethrough illustrating the same in active use when moving through the water.

Figure 3 is a perspective view of the head of the lure with the flexible attracting elements removed therefrom.

Figure 4 is a view similar to Figure 2 illustrating a modified adaptation of the invention.

Referring to the drawing by characters of reference, A designates generally the head of the lure which serves as a mounting for the trailing flexible attracting member or trailer B, which may be constructed of any suitable material, such as hair, fibers, bristles, feathers, pork rind or any equivalent yieldable elements which are designed upon movement of the lure through the water to set up an individual or relative vibratory, quivering, wiggling or other similar desirable action for the simulation of live bait. As shown and as is customary, the elements or materials which make up the trailer or member B is securely bound to and surrounds a reduced trailing shank portion 5 of the head A, the forward leading portion 6 of which has its forward end angulated as at 7 to impart thereto a dividing or zigzag motion when drawn through the water. Ordinarily, the head A is of solid construction and, as previously set forth, the flexible trailer or member B failed to give the activity desired because of the tendency of the water to set up an inwardly acting radial pressure upon the member B when drawn through the water and the consequent resulting coherence, clinging or crowding together of the elements which make up said trailer or member B. In order to counteract this pressure and the cohesive, clinging or crowding action set forth, the present invention comprehends the forming of the head with a longitudinally or axially extending passage 8 having a flared inlet 9 opening through the forward end 7 and an outlet end 10 opening through the rear end 11 of the reduced shank 5, whereby during the movement of the lure through the water, a portion of the water is intaken through the flared inlet 9, passes through the passage 8 and is discharged in the form of a jet through the rear end 11 centrally or axially and within the confines of the element B. This jet serves as a counteracting and radial outwardly acting pressure which overcomes the cohesive action of the elements of the member B and the inward or radial pressure of the water while serving to impart to the strands, fibers or other elements making up the member B, a vibratory, wiggling, quivering or other activity for the simulation of live bait. Due to the frustoconical or inwardly tapering formation of the inlet 9, coupled with the induced suction at the rear end of the head, an increased velocity is imparted to the water flowing through the passage 8 so that the outward or radial pressure of the jet slightly exceeds the inward radial pressure of the water flowing past and around the outside of the member B. This obviously breaks up the cohering tendency of the strands or fibers or other elements of the member B inasmuch as the water forms a flowing film around each individual element of the member. The lure may be associated with the leader or line C which carries the hook D at its free end in any desired manner but, as particularly illustrated in Figure 2 of the drawing, the leader or line C is trained through an aperture or leader bore 12 which opens at its forward end through the forward end 7 of the head A and which opens at its opposite or rear end through the wall of the bore 8, the leader bore 12 being disposed at such an angle to the water passage that the axis of said leader bore if prolonged in a straight line would be spaced from the wall of the water passage where it emerges therefrom. This makes for an unobstructed flow of the water through the water passage for the major portion of the length of said passage, when the lure is mounted on the leader or line. The enlarged portion E at the terminal of the leader or line C which receives and attaches the hook acts as a stop which limits the relative movement of the lure toward the free end of the leader or line C and normally positions the lure in appropriate juxtaposition to the hook D. In this instance, however, the lure is free to move forwardly on the leader or line away from the hook D, so that the weight of said lure will not serve as a means for facilitating the dislodgment of the hook by centrifugal force when the fish attempts to shake the hook free, it being obvious that such an attempt will result only in the free sliding of the lure away from the terminal of the leader or line.

In the form of the invention illustrated in Figure 4, the leader or line F is provided with an enlargement or stop G immediately adjacent its point of emergence from the aperture 12, so that the lure is in effect anchored to the leader or line F whereby to prevent any appreciable relative sliding movement, it being understood that in this type of lure, which is especially designed for casting or fly fishing, the sliding movement is undesirable.

While there have been illustrated and described several preferred embodiments of the invention, it is to be understood that no limitation is intended to the precise details of construction therein exhibited, and that other variations and modifications which are construed to fall within the scope of the claims may be resorted to when desired.

What is claimed is:

1. A fish lure adapted to be drawn through the water, said lure including a head and an attracting trailer composed of a plurality of yieldable elements arranged in surrounding relation to the rear end of and protruding rearwardly from the head, said head having a longitudinal water passage unobstructed throughout the major portion of its length when mounted and of such an area as to permit a sufficient volume of water to flow therethrough and into the trailing member to counteract the cohering tendency of the yieldable elements thereof, caused by radial inward pressure of the water flowing around the trailer.

2. A fish lure adapted to be drawn through the water, said lure including a head and an attracting trailer composed of a plurality of yieldable elements arranged in surrounding relation to the rear end of and protruding rearwardly from the head, said head having a longitudinal water passage unobstructed throughout the major portion of its length when mounted and of such an area as to permit a sufficient volume of water to flow therethrough and into the trailing member to counteract the cohering tendency of the yieldable elements thereof, caused by radial inward pressure of the water flowing around the trailer, said head having a leader bore opening at its rear end into the water passage and disposed at such an angle to the water passage that the axis of the leader bore if prolonged in a straight line would be spaced from the wall of the water passage.

HARLAN W. MAJOR.